United States Patent Office 3,427,294
Patented Feb. 11, 1969

3,427,294
STORAGE-STABLE MONOMER COMPOSITION
Charles T. Arkens, Havertown, Pa., assignor to E. I. du Pont de Nemours and Company, Wilmington, Del. a corporation of Delaware
No Drawing. Filed Mar. 31, 1966, Ser. No. 538,986
U.S. Cl. 260—86.1                    9 Claims
Int. Cl. C08f 19/00, 85/26

ABSTRACT OF THE DISCLOSURE

A mixture of an oxazolidine monomer such as 3-(β-methacryloxyethyl)-2,2-pentamethylene - oxazolidine and an acrylic monomer such as methyl methacrylate is provided which has surprisingly good storage stability even at ordinary room temperature plus excellent utility for the manufacture of light-colored polymer coatings and the like; the mixture contains an inhibitor component in the form of 2-ethylhexyl-octylphenyl phosphite and/or a N,N-dialkylhydroxyl amine such as N,N-diethylhydroxyl amine; also provided is a process for preparing such a mixture wherein one or both of the inhibitors is added to the monomer during or after its preparation.

---

This invention relates to a storage-stable monomer composition containing (A) a monomer selected from the group which may be generally designated as acryloxyalkyl - oxazolidines and acryloxyalkyl-tetrahydro-1,3-oxazines and (B) a monomer selected from the group which may be generally designated as alkyl acrylates.

It is known that alkyl acrylate monomers can be transesterified with N-hydroxyalkyl-oxazolidine compounds in a heated reaction vessel in the presence of a suitable catalyst to produce N-acryloxyalkyl-oxazolidine monomers. Since the acrylyl portion of the molecules contains a double bond, the resulting monomers can be formed into linear polymers and copolymers by a typical vinyl addition process. Polymers are obtainable in this manner which are excellent film-formers for use in adhesives, coatings and the like.

A serious limitation of the known methods of making and using monomer A and mixtures thereof with monomer B (as designated above) is the poor storage stability (shelf life) of these materials, they tend to become useless due to premature polymerization during brief periods of shipment or storage at ordinary ambient temperatures of 20 to 30° C. Also, there is a tendency towards premature polymer formation during the transesterification reaction despite the presence of previously recommended inhibitors, especially when the amount of inhibitor is kept to a minimum in an attempt to avoid undue darkness of color in the product, and when no air is bubbled through the reaction mixture. Prior art mixtures of monomers A and B must be stored in a refrigerator if there is a substantial time lapse between preparation of the monomer compositions and the use of these compositions in the manufacture of polymeric coatings, adhesives and the like. This is particularly true when the monomer A content of the mixture is about 10 to 30% or more by weight of the mixture.

The coating and adhesive industries are in need of mixtures of monomers A and B having substantially improved storage stability.

In a broad sense, the composition of the present invention comprises a mixture of A monomer (A) having the formula

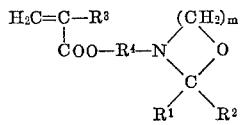

wherein $m$ is an integer having a value of 2 to 3, $R^3$ is selected from hydrogen, methyl, ethyl, chlorine and phenyl, $R^4$ is selected from $C_1$ to $C_5$ alkylene groups, and $R^1$ and $R^2$ are selected from (1) separate groups selected individually from (a) hydrogen, phenyl, benzyl and $C_1$ to $C_{12}$ alkyl groups in the case of $R^1$ and (b) hydrogen and $C_1$ to $C_4$ alkyl groups in the case of $R^2$, and (2) a single group selected from pentamethylene and tetramethylene which, together with the carbon atom to which the single group is attached, forms a carbocyclic group;

A monomer (B) consisting of an ester of a saturated aliphatic monohydric $C_1$ to $C_{18}$ alcohol and an acid of the formula

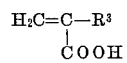

wherein $R^3$ is as defined above; and

A substance (C) selected from 2-ethylhexyloctylphenyl phosphite and N,N-dialkylhydroxyl amines, said substance being present in said composition in an amount effective to inhibit the polymerization of said monomers.

The weight ratio of monomer A to monomer B in said composition being about 0.5:99.5 to 99.5:0.5. The 2-ethylhexyloctylphenyl phosphite is sometimes referred to herein as "EHOP phosphite," and the N,N-dialkylhydroxyl amine is sometimes referred to herein as "DAH amine." A preferred N,N-dialkylhydroxyl amine is N,N-diethylhydroxyl amine, which is sometimes referred to herein as "DEH amine." EHOP phosphite is available commercially as a mixture of 2-ethylhexyl bis(octylphenyl) phosphite and bis(2-ethylhexyl) octylphenyl phosphite; this mixture is an almost colorless pale yellow liquid having a characteristic phosphite odor.

The invention also provides a novel process which is defined broadly as follows: In the process for preparing monomer A of the previous paragraph by transesterifying monomer B of the previous paragraph with an N-hydroxyalkyl compound having the formula

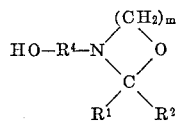

wherein $m$, $R^1$, $R^2$ and $R^4$ are as defined in the previous paragraph, the improvement of inhibiting polymer formation during the transesterification reaction by contacting the reaction mixture with an N,N-dialkylhydroxyl amine in an amount effective to inhibit the polymerization of said monomers.

Another aspect of the invention comprises the process of admixing a substance selected from EHOP phosphite and DAH amines with a mixture of a monomer A and a monomer B as described above in an amount effective to inhibit the polymerization of said monomers.

Monomer A of the novel composition of this invention can be prepared according to the procedures described in U.S. Patent 3,307,006, the disclosure of which is incorporated herein by reference. An especially preferred embodiment of monomer A for use in the present invention has the formula

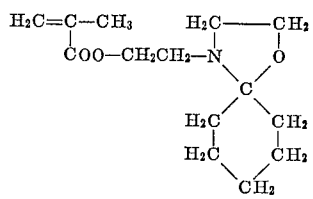

It will be apparent to those skilled in the art that this monomer can be referred to as (1) 3-(β-methacryloxyethyl)-2, 2-pentamethylene-oxazolidine; (2) 3-(2'-methacryloxyethyl) - 2, 2 - spirocyclohexyl - oxazolidine; (3) MESO or (4) 1-oxa-4-(2'-methacryloxyethyl)-4-azaspiro [4.5] decane.

The weight ratio of monomer A to monomer B is about 5:95 to 30:70 in preferred embodiments of the composition; the compositions which are the most practical and economical for use in the manufacture of polymeric coatings and adhesives usually fall within this range.

Monomer B is preferably an ester of acrylic acid or methacrylic acid and a $C_1$ to $C_4$ saturated aliphatic monohydric alcohol.

A preferred composition of the present invention contains both EHOP phosphite and DEH amine (or other suitable DAH amine); however, the invention also comprise using either of these inhibitors alone in an amount effective to inhibit the polymerization of the monomers, for example at least 0.1% of the phosphite or at least 0.02% of the amine.

When both inhibitors are present, it is preferable to use about 0.05 to 0.2% of the amine and about 0.5 to 1.5% of the phosphite based on the combined weight of monomers A and B, a DEH amine content of about 0.1% and and EHOP phosphite content of about 0.9% are particularly preferred. A phosphite content of less than 2% is usually sufficient for satisfactory storage stability. It is generally advisable to use no more than the minimum amount of either inhibitor that is needed for satisfactory storage stability in a particular application since any excess inhibitor merely adds unnecessarily to the cost of the composition. Also, excessive amounts of inhibitors tend to increase the cost of polymerizing the monomer composition since more initiator and/or a longer reaction time may be required to effect the polymerization reaction. The DAH amine content is preferably below about 0.5% when the monomer mixture is to be used in preparing white or light pastel polymer compositions.

While the alkyl group in the DAH amine is preferably ethyl, it can also be any other $C_1$ to $C_{18}$ alkyl group, including a cycloalkyl group.

The N-hydroxyalkyl compound employed in the process of this invention can be prepared in the manner described in U.S. Patent 3,037,006. The process of this invention can be practiced by (1) blending the reagents (N-hydroxyalkyl compound and monomer B) in the desired proportion, (2) adding to the resulting mixture the DAH amine (and optionally some of the EHOP phosphite) in an amount effective to inhibit the polymerization of the monomers (A and B) present during the transesterification reaction and (3) heating the mixture under alkaline conditions (e.g., in the presence of a tetraalkyl titanate or an alkali metal alkoxide) to effect the transesterification of the reagents and thereby form monomer A. The reaction mixture preferably contains (a) about 0.05 to 0.2% of the DAH amine and about 0.1 to 1.0% of the EHOP phosphite based on the weight of the reagents and (b) sufficient excess of monomer B so that upon completion of the reaction there is obtained a 5:95 to 30:70 mixture of monomers A and B.

In a particularly preferred embodiment of the process, about 0.1% of the DAH amine and 0.4% of the EHOP phosphite based on the weight of reagents are added to the reaction mixture. Upon completion of the reaction, about 0.5% more of the EHOP phosphite is added.

The DAH amine is surprisingly effective for preventing polymer formation during the preparation of monomer A by the transesterification reaction described above, and no air or oxygen has to be bubbled through the mixture during the reaction. The amine is also effective by itself or in combination with the EHOP phosphite for preventing polymer formation during storage in mixtures of monomers A and B.

The EHOP phosphite is surprisingly effective by itself or in combination with DAH amine for preventing polymer formation during storage in mixtures of monomers A and B; this is true even when the monomer A content of the mixture is relatively high.

Oxazolidine/alkylacrylate monomer compositions are obtainable in accordance with the present invention which remain substantially free of polymer on prolonged storage at room temperature and which are useful for preparing white or pastel colored polymer coatings. These are important advantages over prior art compositions in this general class. The invention permits the prevention of premature polymerization in large batches of the monomer composition (e.g., hundreds of pounds) as well as in small batches of only a few ounces. Light-colored polymer coatings are obtainable from the monomer composition which have surprisingly good resistance to discoloration by sunlight.

The examples which follow are given for the purpose of illustrating the invention. All quantites shown are on a weight basis unless otherwise indicated.

EXAMPLE 1

A quantity of 3-(β-hydroxyethyl)-2,2-pentamethyleneoxazolidine is prepared by (a) providing a glass reaction vessel equipped with a stirrer, thermometer, and condenser fitted through a water trap, (b) introducing into the reaction vessel 105 grams diethanolamine, 196 grams cyclohexanone and 200 grams benzene, (c) stirring and heating the reaction mixture for 6 hours, starting at a temperature of 95° C. and gradually raising the temperature to 102° C., (d) distilling off 17.5 ml. of water during the 6-hour reaction period, and then distilling off benzene and excess cyclohexanone at reduced pressure and (e) distilling the residue at 0.3 to 0.5 mm. Hg. The colorless liquid collected at 102 to 120° C. (170 grams) is the hydroxyethyl compound mentioned above according to the results of an infrared analysis.

Next, a quantity of a solution of 3-(β-methacryloxyethyl)-2,2-pentamethylene-oxazolidine in methyl methacrylate is prepared by (1) providing a glass reaction vessel equipped with a stirrer, thermometer, dropping burette for catalyst addition and a 35 cm. helix packed column fitted with automatic take-off distilling head, (2) introducing into the reaction vessel the reagents which consist of 78.4 grams of the hydroxyethyl compound prepared above and 600 grams methyl methacrylate, (3) adding 0.1% DEH amine and 0.4% EHOP phosphite based on the combined weight of the reagents, (4) adding 2.7 grams dibutyl tin oxide while stirring and heating the reaction mixture, (5) carrying out the transesterification reaction by continuing to stir and heat the reaction mixture for two hours, starting at a temperature of 95° C. and gradually raising the temperature to 104° C., (6) distilling off 30 grams of distillate consisting of methyl methacrylate and methanol during the two-hour reaction period and (7) adding an additional 0.5% of EHOP phosphite based on the combined weight of methyl methacrylate and oxazolidine monomer in the reaction vessel.

The product is a substantially colorless solution of the oxazolidine monomer in methyl methacrylate, the weight ratio of oxazolidine monomer to methyl methacrylate (monomer A/monomer B) being 14.4/85.6. This monomer composition is found to be completely free of polymer when tested by the so-called "methanol test" in this test, 10 ml. of the monomer composition are agitated with 40 ml. of methanol and the absence of polymer is indicated by the absence of any cloudiness or white precipitate apparent to the unaided eye.

The monomer composition prepared in Example 1 has satisfactory storage stability for convenient scheduling of storage, shipping and subsequent polymer preparation. A portion of this composition is stored for 8 months at 21° C. still contains no visible amount of polymer. A portion of the composition is used for preparing a copolymer of methyl methacrylate and the oxazolidine monomer by (a) Providing a glass reaction vessel equipped with nitrogen inlet, thermometer, anchor stirrer and condenser, charging the reaction vessel with 50 parts of the monomer composition prepared in Example 1, 50 parts xylene and 1 part of α,α'-azodiisobutyronitrile and (b) Heating the mixture under nitrogen at 85° C. for 16 hours. Percent conversion is about 100%.

The resulting copolymer solution is especially useful in the formulation of light colored (white and light pastel) adherent coating compositions and adhesives.

Results similar to those obtained in Example 1 are obtained when the methyl methacrylate used in the transesterification reaction is replaced with either ethylacrylate of butylmethacrylate.

EXAMPLE 2

Example 1 is repeated except (a) Oxygen is bubbled through the reagent mixture during the transetherification reaction and the addition of DEH amine and EHOP phosphite to the reagent mixture is omitted;

(b) Care is taken to avoid an explosion due to the introduction of oxygen and monomer into the exhaust system during the reaction; and (c) The amount of EHOP phosphite added to the monomer mixture in step (7) upon completion of the transesterification reaction is 1.0%.

The monomer composition prepared in Example 2 is useful in the manufacture of light colored and dark colored adherent polymeric coatings and adhesives as well as impregnating compositions for application to a wide variety of substrates. Copolymers produced from this monomer composition are especially useful as the major film-formers in coating compositions for steel and aluminum articles including automobiles.

A portion of the Example 2 monomer composition is stored for 12 months at 21° C. and still contains no visible amount of polymer. Another portion of the composition is stored for 16 weeks at an elevated temperature of 48° C. and surprisingly is still substantially free of polymer. When Example 2 is repeated except the EHOP phosphite is omitted, the resulting monomer composition becomes gelled and therefore useless when stored for about 2 days at 48° C.

When Example 2 is repeated except the amount of EHOP phosphite added is 0.5% by weight of the monomer mixture, the resulting composition can be stored for at least 10 weeks at 48° C. or for several months at 21° C. and still remain nongelled and substantially free of polymer.

EXAMPLE 3

Example 1 is repeated except (a) The amount of DEH amine added to the reagent mixture prior to the transesterification reaction is 0.3% and (b) No EHOP phosphite is added.

The color and utility of the monomer composition prepared in Example 3 are similar to those of the Example 2 composition. A portion of the composition is stored for 8 weeks at 21° C. and is still substantially free of polymer and useful for the preparation of copolymers.

EXAMPLE 4

A quantity of 3-(β-hydroxyethyl)-2-methyl-2-ethyl-oxazolidine is prepared by the general procedure described in the first paragraph of Example 1 from 170 grams diethanolamine, 259.2 grams methyl ethyl ketone and 400 grams toluene.

Next, a quantity of a solution of 3-(β-methylacryloxy-ethyl)-2-methyl-2-ethyl-oxazolidine in methyl methacrylate is prepared by the procedure described in the second paragraph of Example 1 (steps 1–7) except (a) the hydroxyethyl compound of Example 1 is replaced with 66.7 grams of the hydroxyethyl compound prepared in the previous paragraph; and (b) the temperature range during step (5) is 66 to 99° C.

The product is an almost colorless (very pale yellow) solution of the oxazolidine monomer in methyl methacrylate, the oxazolidine monomer/methyl methacrylate weight ratio being about 15/85. This monomer composition is found to contain no polymer when tested by the "methanol test" described above. After a portion of the composition is stored for six months at 48° C., it is still substantially free of polymer; and it has similar utility to the monomer composition of Example 1.

I claim:

1. A storage-stable monomer composition comprising a mixture of
a monomer (A) having the formula

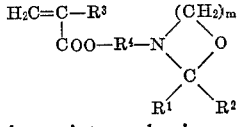

wherein m is an integer having a value of 2 to 3, $R^3$ is selected from the group consisting of hydrogen, methyl, ethyl, chlorine and phenyl, $R^4$ is selected from the group consisting of $C_1$ to $C_5$ alkylene groups, and $R^1$ and $R^2$ are selected from (1) separate groups selected individually from (a) hydrogen, phenyl, benzyl and $C_1$ to $C_{12}$ alkyl groups in the case of $R^1$ and (b) hydrogen and $C_1$ to $C_4$ alkyl groups in the case of $R^2$ and (2) a single group selected from pentamethylene and tetramethylene which, together with the carbon atom to which the single group is attached, forms a carbocyclic group,
a monomer (B) consisting of an ester of a saturated aliphatic monohydric $C_1$ to $C_{18}$ alcohol and an acid of the formula

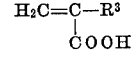

wherein $R^3$ is as defined above; and, as inhibitors, 2-ethylhexyloctylphenyl phosphite and an N,N-dialkyl-hydroxyl amine having 1–18 carbon atoms in the alkyl group, said inhibitors being present in said composition in an amount effective to inhibit the polymerization of said monomers,
the weight ratio of monomer A to monomer B in said composition being about 0.5:99.5 to 99.5:0.5, and the weight ratio of said amine to said phosphite in said composition being about 3:97 to 83:17.

2. A composition according to claim 1 wherein the amine inhibitors is N,N-diethylhydroxyl amine.

3. A composition according to claim 2 which contains about 0.05 to 0.2% of said amine and about 0.5 to 1.5% of said phosphite based on the total weight of monomers A and B.

4. A composition according to claim 2 wherein the weight ratio of monomer A to monomer B is about 5:95 to 30:70.

5. A composition according to claim 2 wherein monomer A is 3-(β-methacryloxyethyl)-2,2-pentamethylene-oxazolidine.

6. A composition according to claim 2 wherein monomer B is an ester of a $C_1$ to $C_4$ alcohol and an acid selected from acrylic acid and methacrylic acid.

7. In the process for preparing monomer A of claim 1 by transesterifying monomer B of claim 1 with an N-hydroxyalkyl compound having the formula

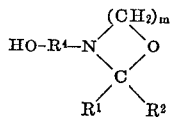

wherein $m$, $R^1$, $R^2$ and $R^4$ are as defined in claim 1, the improvement of inhibiting polymer formation during the transesterification reaction by admixing the reaction mixture with 2-ethylhexyloctylphenyl phosphite and an N,N-di-lower alkylhydroxyl amine in an amount effective to inhibit the polymerization of said monomers.

8. A process according to claim 7 wherein said reaction mixture contains about 0.05 to 0.2% of said amine and about 0.1 to 1.0% of said phosphite based on the weight of the reagents.

9. A process for preparing a storage-stable monomer composition which comprises admixing 2-ethylhexyloctylphenyl phosphite and an N,N-di-lower alkylhydroxyl amine with monomers A and B as defined in claim 1 in an amount effective to inhibit the polymerization of said monomers.

References Cited

UNITED STATES PATENTS 3,037,006  5/1962  Hankins et al. ____ 260—87.5 X
3,148,225  9/1964  Albert _____ 260—83.3 X LEON D. ROSDOL, *Primary Examiner.*

S. D. SCHWARTZ, *Assistant Examiner.*

U.S. Cl. X.R.

252—182, 188.3; 260—80.5, 83.3, 84.7, 87.5